Dec. 15, 1925. 1,566,191
M. C. L. G. FLEISCHEL ET AL
SAWING MACHINE
Filed Nov. 8, 1923
Work-Holding Means with the Saw-Guard.
143-Digest
Holder-Guard.
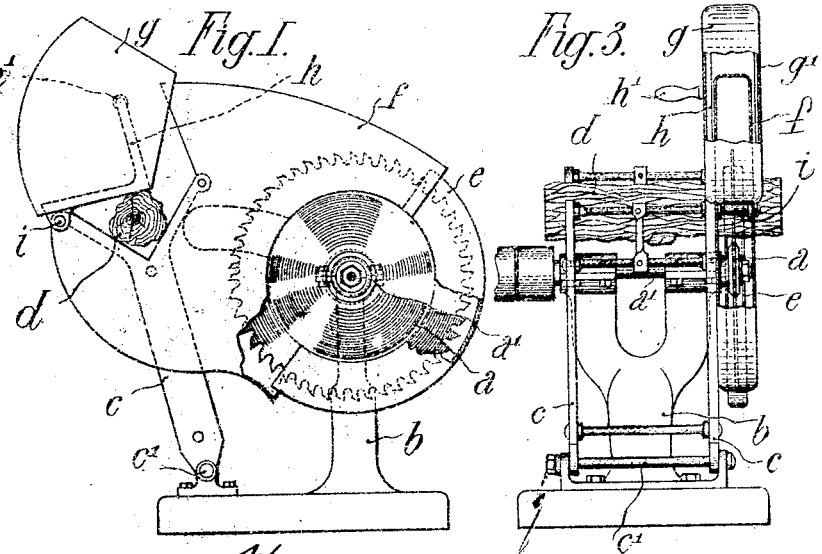
= British 207,821 4/3/24 in 143-58.
= French 574,052 3/22/24 in 143-159-6.
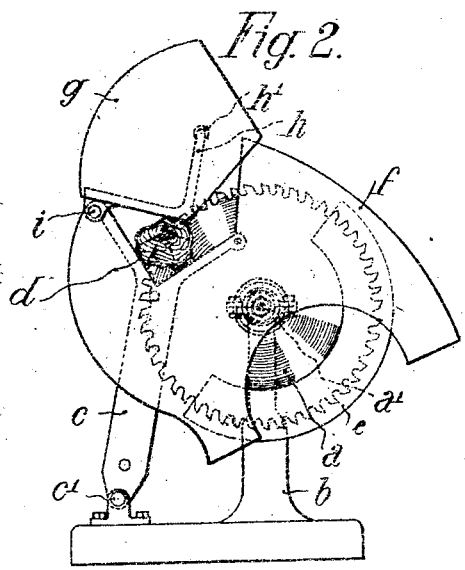
Inventors
Marie C.L.G. Fleischel and
Emmanuel L.F.M. Pironneau,
by James L. Norris
Attorney Patented Dec. 15, 1925.                                                      1,566,191

UNITED STATES PATENT OFFICE.

MARIE CHARLES LÉON GASTON FLEISCHEL AND EMMANUEL LOUIS FRANCOIS MARIE PIRONNEAU, OF PARIS, FRANCE.

SAWING MACHINE.

Application filed November 8, 1923.   Serial No. 673,601.

*To all whom it may concern:*

Be it known that we, MARIE CHARLES LÉON GASTON FLEISCHEL and EMMANUEL LOUIS FRANCOIS MARIE PIRONNEAU, both engineers, and citizens of the French Republic, residing at Paris, France, have invented certain new and useful Improvements in Sawing Machines, of which the following is a specification.

This invention relates to sawing machines provided with circular saws; and it refers more particularly but not exclusively amongst machines of the class in question to those for cutting logs, as it is in their case that the most satisfactory result is obtained.

The principal object of the invention is to provide machines of the type under consideration with more efficient means of protection than has hitherto been the case, while permitting the wood being sawn to be retained in position during working.

The mechanism according to the invention is of the type in which a support or work holder is provided for holding the piece to be sawn and oscillating the same with respect to the saw, and the invention consists essentially in combining with such a machine a protective system comprising a fixed element attached to the frame or base and adapted to shield or cover a portion of the saw, a second element fixed to the holder and so arranged that it does not prevent the piece to be sawn being brought into the position which it must take up for the sawing, and a third element hinged to the whole device formed by the holder and the second element, such third element being so arranged that it can be moved towards the piece to be sawn when in the working position, the whole arrangement being such that the various elements mutually cover one another so that during the whole period of oscillation of the holder, both during the forward and the return movements, the saw is completely covered by the said elements.

The invention comprises in addition to the principal feature just described, certain other features or arrangements which are preferably employed at the same time and which will be more fully described hereafter.

Among these may be mentioned a device hinged to the whole formed by the holder and the second element, which device when operated in a certain direction ensures the correct positioning of the piece to be sawn in the holder while at the same time allowing the said piece to be presented to the saw.

The invention also comprises certain constructional embodiments about to be described.

In order that the said invention may be further understood it will now be explained with reference to the accompanying drawing, but it is to be observed that the said description and drawing are given merely by way of example.

Figs. 1 and 2 of these drawings are both side elevations of a machine provided with a circular saw adapted to cut logs and constructed according to the invention. Fig. 1 shows this machine in the position in which the log is about to be fed to the saw, whilst Fig. 2 shows it at the moment when the sawing operation commences.

Fig. 3 is an elevation with parts in section of the machine in the same position as at Fig. 1.

The machine illustrated is of an ordinary type and is shown as previously stated adapted according to the invention in the most satisfactory manner for sawing logs or the like.

$a$ is the circular saw mounted upon a spindle $a^1$ in bearings upon a frame or base $b$. $c$ is a holder adapted to support a log $d$ to be sawn and to bring the same up to the saw by oscillating upon the frame or base around a pivotal axis $c^1$.

In providing this machine with protective means for shielding the saw, the arrangement is substantially as follows:—

The first element of the protective system consists of a piece $e$, which has a cross section which is substantially that of a U for a certain distance between its ends. This piece is adapted to cover the portion of the saw opposite to the holder and is fixed in position upon the frame or base $b$. The said piece $e$ covers the saw, by preference for such a distance as regards its periphery, that the said saw can be passed between the holder and the extremities of the said piece.

A second element of the protective system consists of another piece $f$, the cross of which for a certain distance between its ends is of substantially rectangular form. This piece is adapted to be fixed towards one of its extremities by one of its side walls corresponding to a longer side of the rectangle and against the side of the work holder. Its walls at this extremity are cut away in such a manner that a log can be placed in position in the holder projecting in such a manner that it can be sawn. The arrangement is moreover such that at the said extremity there is only such an amount of opening as that necessary and sufficient for enabling the said log to be placed in position upon the holder. Moreover when the holder is receiving the log or other work piece the second element encases at its other extremity for a certain length the extremities of the element e, as shown clearly at Fig. 1, and in proportion as the holder oscillates towards the saw a and until the position shown in Fig. 2 is reached in which the sawing of the log is completed it covers more and more the extremities of the said piece e.

The third element of the protective or guard system comprises a piece g. This piece has in cross section for a certain distance between its extremities, the general shape of a U. It is hinged in such a way on the entire device constituted by the holder and the piece f that it forms a continuation of the lower portion of these two pieces. It can be turned down towards the log in position on the holder, and when in this position it embraces the upper portion of the corresponding extremity of the member f. When the whole device constituted by the loaded holder and the two members f and g is oscillated, the piece g rides further and further over the piece f, which in turn rides more and more over the piece e.

The result of this arrangement is that during working, the log is presented to the saw without there being any danger of an attendant being wounded by the said saw, which is so to speak completely enclosed as if it were in a box by the three elements constituting the guard system. The restoration of the oscillating devices on the return movement, after the log has been sawn is likewise effected without risk of wounding the attendant.

Although the arrangement just described gives excellent results, it is desirable to combine with the machine means for enabling the log to be presented in a stable position to the saw while retaining it upon the holder.

The means in question may advantageously comprise a lever h, hinged to the holder by means of a spindle i parallel to the pin of the hinge $c^1$ of the said holder. The arrangement is such that when pressing in a suitable direction upon a handle $h^1$ comprised by this lever opposite to the surface $g^1$ of the member g—for instance placing oneself in such a position as to view the machine from the side of the holder—it is possible to exert on the log by means of the said lever a pressure which can be as great as may be desired and to present the said log to the saw perfectly immovably with respect to the holder.

As will be readily understood and as has moreover been already stated the invention is not limited in any way to those methods of application or to the constructional embodiment of the various parts which has been specifically described. It includes on the other hand all modifications falling within a fair interpretation of the claims.

What we claim and desire to secure by Letters Patent of the United States of America is:—

1. In a sawing machine embodying a circular saw a framework supporting such saw and an oscillating holder for presenting the log or the like to be sawn to the saw, a protective or guard system comprising a first element fixed to the framework and adapted to guard or shield a portion of the saw, a second element carried by the holder and so shaped as not to prevent the piece to be sawn from being brought into the proper position for sawing, and a third element hinged to one of said elements and so arranged as to be movable towards the piece to be sawn when in place said elements mutually engaging one another in such a way that during the whole period of oscillation, of the holder, the saw is in either direction completely enclosed by the said elements.

2. In a sawing machine as claimed in claim 1, wherein the first element of the protective or guard system is substantially V-shaped in cross section for a portion of its length and encloses the portion of the saw opposite to the holder.

3. A sawing machine as claimed in claim 1 wherein the second element of the protective or guard system has a section for a certain distance between its extremities which is substantially rectangular, said second element being fixed by one of its walls corresponding to the longer sides of the rectangle laterally to the holder: the said second element being cut away at the end connected to the holder so as only to leave an opening of necessary and sufficient size for inserting the piece to be sawn into proper position on the holder: the said element being adapted to engage at its other extremity the first mentioned element and to progressively cover it as the piece to be sawn is cut.

4. A sawing machine as claimed in claim 1, wherein the third element of the protective or guard system has in cross section for a certain distance between its extremities the general shape of a U, the said element being pivoted on the oscillating unit formed by the holder and the second element by means of a pin parallel to the pivot pin of the holder in such a way that when the piece to be sawn is in position on the holder, the said third element can be lowered towards the said piece and embrace at the same time the upper portion of the corresponding extremity of the second element.

5. A sawing machine as claimed in claim 1 wherein the third element of the system in order to bring it into the working position is constructed so as to be lowered against the piece to be sawn when once placed in position on the holder and the oscillating system is brought towards the saw.

6. A machine for sawing as claimed in claim 1, wherein means is combined with the oscillating unit formed by said holder, second, and third elements adapted when operated in an appropriate manner to cause the oscillating whole to be brought towards the saw and ensures the holding of the piece in position in the holder.

7. A sawing machine as claimed in claim 1, wherein the auxiliary means in connection with said oscillating unit comprises a bent lever pivoted towards one of its extremities by means of a pin parallel to the pivot pin of the holder, on the said oscillating unit: the arm of the pivoted lever being adapted to come, in the neighbourhood of the bend, into contact with the piece to be sawn located upon the holder; the other arm of the lever being provided with an operating handle: the whole arrangement being such that when operating on the handle in a suitable manner it is possible at the same time to push the oscillating unit towards the saw and at the same time to retain the piece to be sawn in position on the holder.

8. A sawing machine as claimed in claim 1, wherein the first element of the protective or guard system embraces the saw for such a distance that the said saw can be passed for the purposes of mounting or dismounting between the holder and the extremity of the said element.

In testimony whereof we have hereunto set our hands.

MARIE CHARLES LÉON GASTON FLEISCHEL.
EMMANUEL LOUIS FRANCOIS MARIE PIRONNEAU.